United States Patent [19]

Thayer et al.

[11] Patent Number: 4,832,522

[45] Date of Patent: May 23, 1989

[54] ADAPTER EXTENSION FOR PLUNGERS AND THE LIKE

[75] Inventors: Dale F. Thayer; Robert L. Dickherber, both of Albany; David L. Huizenga, Fulton, all of Ill.

[73] Assignee: Adaptive Concepts, Ltd., Albany, Ill.

[21] Appl. No.: 149,340

[22] Filed: Jan. 28, 1988

[51] Int. Cl.⁴ .............................................. F16B 7/04
[52] U.S. Cl. ..................................... 403/19; 403/166; 403/289; 376/254; 376/285
[58] Field of Search ............... 376/254, 255, 362, 364, 376/440, 446, 260, 463, 285; 403/289, 290, 361, 166, 19; 285/921

[56] References Cited

U.S. PATENT DOCUMENTS

| | | | |
|---|---|---|---|
| 2,080,844 | 5/1937 | Wittig | 403/289 |
| 2,327,951 | 8/1943 | Zaleske | 403/289 |
| 2,653,029 | 9/1953 | Shore | 403/290 |
| 3,186,745 | 6/1965 | Lyles | 403/361 |
| 3,299,830 | 1/1967 | Hora | 403/290 |
| 3,343,858 | 9/1967 | Rice | 403/309 |
| 3,756,634 | 9/1973 | McGlothlin | 403/361 |
| 4,318,776 | 3/1982 | Pröll et al. | 376/254 |
| 4,564,308 | 1/1986 | Ikegami et al. | 403/166 |
| 4,589,308 | 5/1986 | Palm | 403/361 |
| 4,678,618 | 7/1987 | Wilson et al. | 376/364 |
| 4,716,004 | 12/1987 | Merkovsky et al. | 376/254 |

FOREIGN PATENT DOCUMENTS

| | | | |
|---|---|---|---|
| 0047095 | 4/1979 | Japan | 376/285 |
| 1218992 | 9/1986 | Japan | 376/254 |

*Primary Examiner*—Deborah L. Kyle
*Assistant Examiner*—Daniel Wasil
*Attorney, Agent, or Firm*—Henderson & Sturm

[57] ABSTRACT

The adapter extension of subject invention provides for the coaxial extension of a plunger or rod whose effective length has become shortened by weakness or failure of a back-up spring which causes the plunger or rod to lose its effectiveness as a strut, for example, a situation that occurs primarily in nuclear reactors where the plunger engages a grid, whereas the grid provides lateral support to the upper end of the dry tube. The adapter is thimble-like and fits tightly over the end of the plunger that engages the grid. The adapter contains a spring which has the effect of substituting for or supplementing the original spring behind or below the plunger. The body of the adapter includes a retainer for holding the interior spring captive during assembly and operation of the adapter.

4 Claims, 2 Drawing Sheets

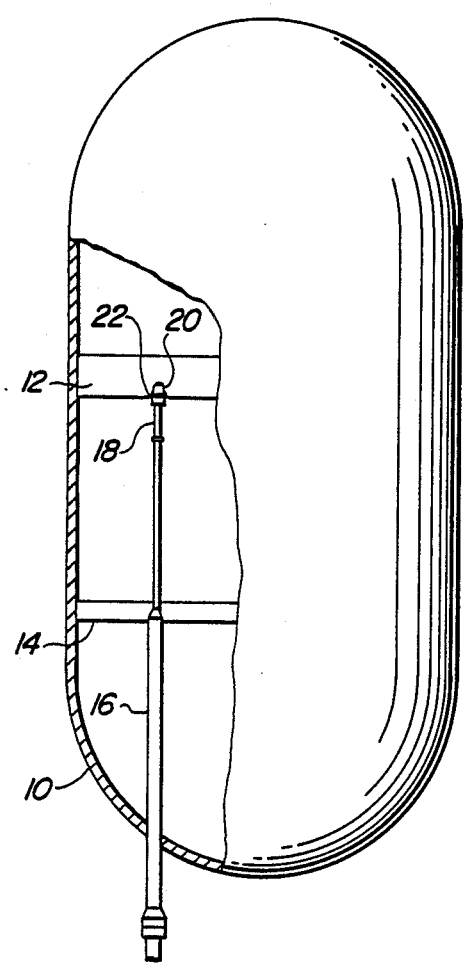
Fig. 1
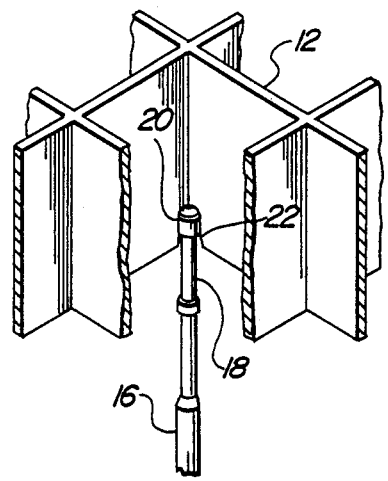
Fig. 2
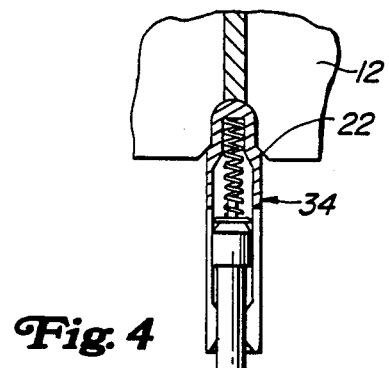
Fig. 4
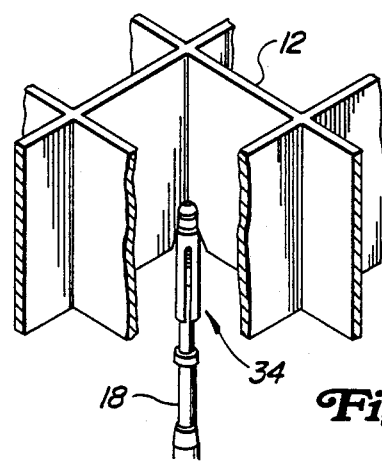
Fig. 3
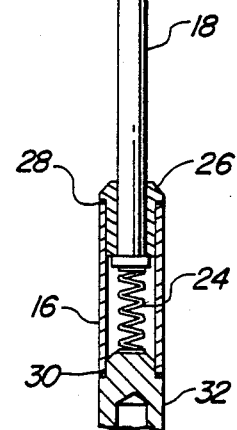

ADAPTER EXTENSION FOR PLUNGERS AND THE LIKE

BACKGROUND AND SUMMARY OF THE INVENTION

The background reference here is to be considered as exemplary and not limiting. A boiling water nuclear reactor contains dry tubes which extend from the bottom of the reactor vessel to just below the upper core support grid and provide a water-tight cavity within the vessel for the reactor in core nuclear flux detectors. The upper end of each dry tube includes a spring-loaded plunger which engages the bottom of the upper support grid. Experience has shown that some plungers are not fully engaged in the bottom of the upper core support grid, a malfunction normally traceable to weakening of the plunger spring. Replacement of the defective plunger spring in the dry tube is not possible while the tube is in the reactor, thus requiring removal and replacement of the dry tube as the only heretofore recognized method of achieving repair.

According to the present invention, a simplified method of repair is provided which allows continued use of existing dry tubes. The invention comprises the provision of an extension adapter for the upper end of the defective plunger, resulting, in effect, in elongating the plunger to the extent necessary to make up for its decreased effective length because of the failure of its original spring. The adapter extension may be easily installed between the existing plunger and grid while the dry tube remains in the reactor vessel, as by the use of remote tools and viewing aids.

It is a feature of the invention that the adapter is a self-contained unit that fits tightly over the upper or free end of the plunger and contains its own captive spring which exerts forces between the interior of the adapter and top of the plunger so as to supplement the effect of the original spring or to substitute its force for the old spring, depending upon the extent of weakening of the old spring. A still further feature of the invention is that the adapter spring is backed up by a retainer and the walls of the adapter are so configured as to enable installation of the spring and retainer within the adapter body while preventing accidental escape of the spring and retainer. The configuration of the adapter walls is also such as to effectuate engagement of lugs on the walls with a knob at the upper end of the plunger.

The foregoing and other significant features and advantages of the invention will become apparent from the ensuing disclosure of a preferred embodiment of the invention.

DESCRIPTION OF THE DRAWINGS

FIG. 1 is a somewhat schematic view, partly in section, illustrating the presently perceived use of the invention, the view showing the existing plunger.

FIG. 2 is an isometric view, with parts broken away and omitted, showing the existing structure in enlarged form.

FIG. 3 is a view similar to FIG. 2 but showing the use of the adapter of the present invention in relation to the grid.

FIG. 4 is an enlarged sectional view of the existing plunger with the adapter assembled thereto.

DETAILED DESCRIPTION OF A PREFERRED EMBODIMENT OF THE INVENTION

Figure 5:
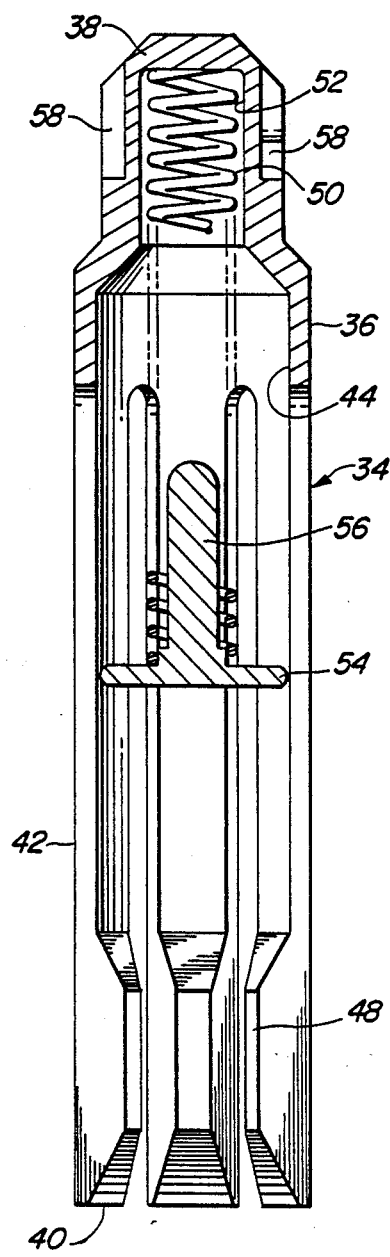
FIG. 5 is an enlarged sectional view of the adapter assembly.
Figure 6:
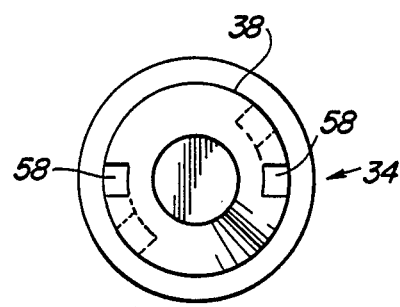
FIG. 6 is a top view of the adapter.
Figure 7:
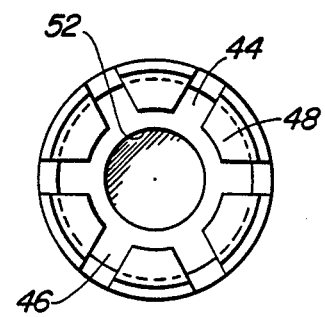
FIG. 7 is a bottom view of the adapter.
Figure 8:
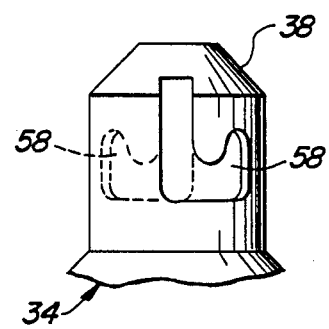
FIG. 8 is an elevation of just the upper portion of the adapter, particularly showing the configuration of the adapter for receiving an installing tool.

By way of background, FIG. 1 illustrates a boiling water reactor pressure vessel (10) which contains an upper core support grid (12), a lower support grid (14), a dry tube (16) and a dry tube plunger (18). It will be understood that several tube-plunger assemblies are provided and that but one is shown for purposes of explanation. As seen, the upper end of the plunger has a knob (20) which typically fits into a recess (22) in the grid. FIG. 4 best shows that the lower part of the plunger is vertically axially slidable in the upper part of the dry tube (16) and that a coiled compression spring (24) biases the plunger upwardly for urging its upper end knob into the grid recess (22). This view also shows that a plunger guide (26) is welded (28) to the top of the dry tube spring housing and the bottom of the housing is welded at (30) to a dry tube end plung (32). Hence, it will be clear that disassembly of the plunger from the dry tube is practically impossible while installed in the reactor vessel. It will also be seen that weakening of the spring (24) results in decay of its upward force on the plunger and hence inadequate engagement in the upper grid (12).

The present invention provides a simple solution to the aforesaid problem without requiring extensive teardown of equipment and without high radiation exposure to personnel. The adapter extension for the plunger is denoted in its entirety by the numeral (34) and is best shown in FIG. 5 as comprising a thimble-like body (36) of cylindrical section having a closed upper end (38), an open bottom (40) and a cylindrical wall (42) extending from end to end or between the upper and lower ends. The structure thus provides an interior (44) dimensioned diametrically to receive the upper part of the existing plunger (18), specifically the enlargement or knob (20). The wall (42) has a plurality of lengthwise slits (46) to provide resilience in the body to enable inward projections or lugs (48) to snap over and under the plunger knob when the adapter is axially assembled to the plunger, it being clear that this form of attachment retains the adapter on the plunger against accidental upward separation.

Before installation of the adapter on the plunger, the adapter is first equipped internally with a coiled compression spring (50) having its upper end piloted in a blind bore (52) in the body and its lower end associated with a retainer (54) which has an axially upwardly projecting spring pilot (56). The retainer is preferably circular and has a diameter that tolerably fits within the body interior so as to be axially movable. Further, the dimensions of the retainer are such that, after it is inserted upwardly into the body interior following insertion of the spring, by way of spreading the slit wall portions, the wall portions spring back and keep the spring and retainer from escaping from the adapter. Thus the adapter is self-contained in the sense that it is a complete assembly with its enclosed spring and retainer and can be easily handled, stored, etc., without fear of losing interior parts.

The upper exterior of the top of the adapter is provided with means for receiving a tool (not shown) by which the adapter may be assembled to the top of the existing plunger. This means here takes the form of a pair of "J" slots (58) by way of example. During installation of the adapter by remote poles and viewers, for example, the adapter is slipped over the upper end of the existing plunger and then a downward force exerted sufficient to snap the body lugs over the knob on the plunger. The adapter spring retainer then abuts the top of the plunger knob and the interior spring is under compression, thus exerting an upward force on the adapter, causing its configured upper end to fit into the recess (22) in the upper grid. As noted before, the adapter so grips the knobbed plunger as to prevent accidental detachment thereof from the plunger.

Features and advantages of the invention other than those pointed out herein will readily occur to those versed in the art, as will many modifications in the preferred embodiment of the invention, all without departing from the spirit and scope of the invention.

I claim:

1. An adapter for attachment to one end of a plunger as a coaxial extension of the plunger, comprising a one-piece, elongated thimble-like body having a closed end, an opposite open end and an annular wall extending lengthwise between the ends and providing a hollow interior, said wall being provided with a plurality of lengthwise slits opening at the open end of the body and terminating adjacent to the closed end of the body and thus affording lengthwise body portions intermediate the slits, said portions respectively having laterally inwardly projecting lugs at the open end of the body, said body portions intermediate the slits being laterally resilient to normally restrict the open end of the body but laterally outwardly spreadable to facilitate lengthwise access to the interior of the body, a spring contained coaxially within the interior of the body and having a first end abutting the interior of the closed end of the body and an opposite second end spaced lengthwise from the lugs, a spring retainer axially slidably within the body interior and interposed between the lugs and the second end of the spring, said retainer having such diameter as to fit tolerably within the body interior and normally retained within the body interior by the lugs.

2. The adapter of claim 1, in which the spring is helical on the body axis and the retainer includes a central pilot received axially within the second end of the spring.

3. The adapter of claim 1, in which the interior of the body at the closed end thereof has a reduced-diameter portion receiving the first end of the spring.

4. The adapter of claim 1 including means on the exterior of the closed end of the body for receiving tool for manipulating the adapter relative to the plunger.

* * * * *